United States Patent [19]

Naiini et al.

[11] Patent Number: 5,789,525

[45] Date of Patent: Aug. 4, 1998

[54] PROCESS FOR MAKING POLYIMIDES FROM DIAMINES AND TETRACARBOXYLIC DIACID DIESTER

[75] Inventors: Ahmad Naiini, Warwick; Steve L. C. Hsu, East Providence; William D. Weber, Cranston, all of R.I.; Andrew J. Blakeney, Seekonk, Mass.

[73] Assignee: Olin Microelectronic Chemicals, Inc., Norwalk, Conn.

[21] Appl. No.: 842,615

[22] Filed: Apr. 15, 1997

[51] Int. Cl.$^6$ .............. C08G 73/10; C08G 69/28; C08G 69/26

[52] U.S. Cl. .............. 528/170; 528/173; 528/188; 528/229; 528/310; 528/312; 528/313; 528/322; 528/324; 528/331; 528/332; 528/337; 528/345; 528/347; 528/353

[58] Field of Search .................. 528/170, 173, 528/188, 229, 310, 312, 313, 322, 324, 331, 332, 337, 345, 347, 353; 524/600, 606

[56] References Cited

U.S. PATENT DOCUMENTS

| | | | |
|---|---|---|---|
| 3,179,630 | 4/1965 | Endrey | 524/600 |
| 3,179,632 | 4/1965 | Hendrix | 524/600 |
| 3,271,366 | 9/1966 | Kreuz | 524/600 |
| 3,282,898 | 11/1966 | Angelo | 524/600 |
| 3,541,057 | 11/1970 | Kreuz | 524/600 |
| 5,302,489 | 4/1994 | Shu | 430/191 |
| 5,399,655 | 3/1995 | Simmons, III | 528/176 |
| 5,587,275 | 12/1996 | Kato | 430/283.1 |

FOREIGN PATENT DOCUMENTS 0 421 195 A2  4/1991  European Pat. Off. .

OTHER PUBLICATIONS

Mitsuru Ueda et al., *Macromolecules 1988*, 21, 19–24 The month in the pub. date is not available.

M. Ueda et al., *Makromol. Chem.*, 194, pp. 511–521 (1993) The month in the pub. date is not available.

*Primary Examiner*—P. Hampton-Hightower
*Attorney, Agent, or Firm*—Ohlandt, Greeley, Ruggiero & Perle

[57] ABSTRACT

A process for making polyimide composition comprising reacting at least one diamine, at least one tetracarboxylic diacid diester, selected phosphoramide and at least one base catalyst to form at least one polyimide compound, said reaction carried out at a temperature from about 20° C. to about 60° C. and wherein the molar ratio of diamine:tetracarboxylic diacid diester:phosphoramide:base catalyst is in the range of 0.8–1.2:1:2.5–4.0:2.5–4.0.

5 Claims, No Drawings

PROCESS FOR MAKING POLYIMIDES FROM DIAMINES AND TETRACARBOXYLIC DIACID DIESTER

BACKGROUND OF THE INVENTION

1. Field of the Invention

This invention relates to a process for making polyimide compositions by reacting a specific coupling/imidization reagent with at least one tetracarboxylic diacid diester and at least one diamine in the presence of a base catalyst under reaction condition suitable for making polyimides. These polyimide compositions are useful as organic dielectric insulting films for use in electronic semiconductor devices and multilayer electronic structures; as protective coatings on or in electronic semiconductor devices and packages; as oriented films for use in the fabrication of liquid crystal display elements; as matrix resins in structural composites; and as membranes for use in separation processes.

2. Brief Description of the Art

Aromatic polyimides are usually synthesized by two-step method. In the first step, a soluble precursor, polyamic acid is formed by the reaction of at least one diamine with at least one dianhydride. In the second step, cyclization of the polyamic acid or polyamic acid ester creates the polyimide. The second reaction (i.e., an imidization reaction) can be carried out by heating at elevated temperature usually 150°–300° C. or by treatment with chemical imidization agents at ambient temperature. The most common used dehydrating agents are acid anhydrides with a base catalyst. The acid anhydrides used include acetic anhydride, propionic anhydride, n-butyric anhydride, benzoic anhydride and the like. The base catalysts used in the past included pyridine, trialkylamine, methylpyridine, lutidine, n-methylmorpholine, and the like. Alternatively, polyamic acid esters have been used in the past instead of polyamic acids as precursors for polyimides. However, because of their higher cost, polyamic acid esters have not been favored.

Separately, the synthesis of diphenyl(2,3-dihydro-2-thioxo-3-benzoxazoyl)phosphonate (DDTBP) (see formula (1)) and its use as an activating agent for making polyamic acid esters was first reported by Mitsuru Ueda et al. in 1988 (*Macromolecules* 1988, 21, 19–24). Its structure is shown in formula (I):

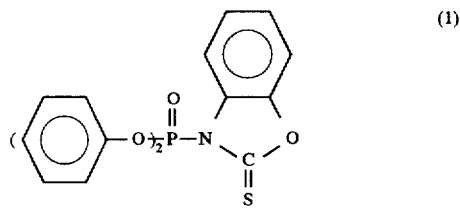

(1)

Recently, E. Chin et al. (see *Advances in Polyimide Science and Technology—Proceeding of the Fourth International Conference on Polyimides*—Edited by C. Feger et al. 1993, pages 201–212, Technanic Publishing Co., Ltd., Lancaster, Pa.) teach the use of DDTBP as a coupling reagent to prepare polyamic acid esters by the direct polycondensation from tetracarboxylic diacid diester monomers.

Also Hayese et al. (see *Journal of Applied Polymer Science*, Vol. 51, pages 1971–1978 (1994) teach the reaction of a tetracarboxylic diacid diester with a diamine a polyamic acid diester.

And, M. Ueda et al. (see *Makromol. Chem.*, 194, 511–521 (1993)) teach the direct polycondensation of di-tert. butyl esters of tetracarboxylic acids with diamines to make polyamic acid tert.-butyl esters, using DDTBP as the activating agent.

None of these references reported that DDTBP may be used as a chemical imidization agent for making polyimides. In the present invention, it has been found that the use of phosphoramides such as DDTBP in combination with a base catalyst will couple and chemically imidize a mixture of diamine and tetracarboxylic diacid diester to form a polyimide composition.

SUMMARY OF THE PRESENT INVENTION

Accordingly, the present invention is directed to a process for preparing polyimide composition comprising reacting at least one diamine and at least one tetracarboxylic diacid diester with a phosphoramide in the presence of at least one base catalyst to form a polyimide composition at a temperature from about 20° C. to about 60° C. and wherein the molar ratio of diamine:tetracarboxylic diacid diester:phosphoramide:base catalyst is in the range of 0.8–1.2:1:2.5–4.0:2.5–4.0 and wherein said phosphoramide is a compound of formula (2):

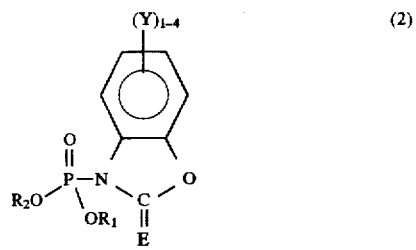

(2)

wherein

E is either oxygen or sulfur; $R_1$ and $R_2$ are individually selected from the group consisting of alkyl group having 1–4 carbon atoms, aryl group, substituted aryl group having 1–3 substituents, said substituents are individually selected from halogen group, nitro group, alkyl group having 1–4 carbon atoms, and alkoxy group having 1–4 carbon atoms; and each Y is individually selected from hydrogen halogen group, nitro group, alkyl group having 1–4 carbon atoms and alkoxy group having 1–4 carbon atoms.

DETAILED DESCRIPTION OF THE PREFERRED EMBODIMENTS

This invention relates to the one step synthesis of polyimides from tetracarboxylic diacid diesters and diamines in the presence of selected phosphoramides and a base catalyst. This reaction is illustrated by the following Reaction 1.

Reaction 1

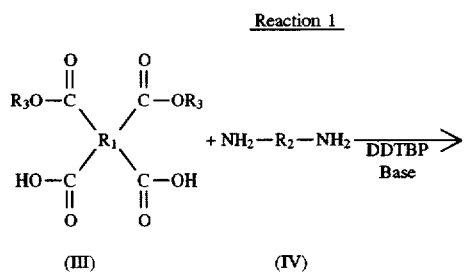

(III)          (IV)

-continued
Reaction 1

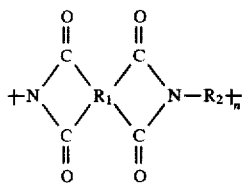

wherein $R_1$ is a tetravalent radical, $R_2$ is a divalent radical; and $R_3$ is a monovalent radical.

1) Preferred Phosphoramides

The preferred phosphoramide is diphenyl (2,3-dihydro-2-thioxo-3-benzoxazoyl) phosphonate (DDTBP) or where E is sulfur; $R_1$ and $R_2$ are both phenyl groups and all Y groups are hydrogen.

The preferred method for making DDTBP is that described by Ueda et al. (*Macromolecules* 1988, 21, 19–24) except that toluene is used instead of benzene.

2) Preferred Tetracarboxylic Diacid Diesters

The preferred tetracarboxylic diacid diesters are those of Formula (III). These can be prepared by reaction of one mole of tetracarboxylic dianhydride (I) with about two moles of an alcohol or phenol derivative (II) according the reaction 2 below. This reaction produces different isomers of tetracarboxylic diacid dianhydride and this isomerization is shown by arrows in compound (III).

Reaction 2

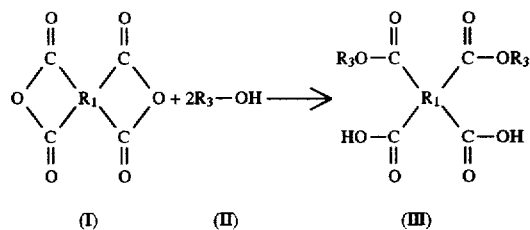

The tetracarboxylic dianhydride (I) includes but is not restricted to the following: 3,3',4,4'-benzophenonetetracarboxylic dianhydride, 3,3',4,4'-biphenyltetracarboxylic dianhydride, 3,3',4,4'-diphenylsulfonetetracarboxylic dianhydride, 4,4'-perfluoroisopropylidinediphthalic dianhydride, 4,4'-oxydiphthalic anhydride, bis(3,4-dicarboxyl) tetramethyldisiloxane dianhydride, bis(3,4-dicarboxylphenyl)dimethylsilane dianhydride, butane tetracarboxylic dianhydride, and 1,4,5,8-naphthalenetetracarboxylic dianhydride. These tetracarboxylic dianhydrides can be used singly or in combination. The tetracarboxylic dianhydride could not be pyromellitic dianhydride (PMDA) because little imidization occurs if this dianhydride is used.

The alcohol or phenol derivatives (II) include but are not restricted to the following: methyl alcohol, ethyl alcohol, isopropyl alcohol, n-butyl alcohol, t-butyl alcohol, 2-hydroxybenzyl alcohol, 3-hydroxybenzyl alcohol, and 4-hydroxybenzyl alcohol.

The preferred reaction conditions for making tetracarboxylic diacid diesters include reaction temperature from ambient temperature to reflux temperature of the particular alcohol or phenol derivative employed and reaction times from about 1 to about 24 hours, depending on the particular reactants used.

The most preferred tetracarboxylic diacid diesters are those mentioned in Examples 1–11 below.

3) Preferred Diamines

The diamine compounds of formula (IV) could be, but is not restricted to, the following: m-phenylenediamine, p-phenylenediamine, 2,2'-bis(trifluoromethyl)-4,4'-diamino-1,1'-biphenyl, 3,4'-diaminodiphenyl ether, 4,4'-diaminodiphenyl ether, 3,3'-diaminodiphenyl ether, 2,4-tolylene-diamine, 3,3'-diaminodiphenyl sulfone, 3,4'-diaminodiphenyl sulfone, 4,4'-diaminodiphenyl sulfone, 3,3,'-diaminodiphenylmethane, 4,4'-diaminodiphenylmethane, 3,4'-diaminodiphenylmethane, 4,4',-diaminodiphenyl ketone, 3,3'-diaminodiphenyl ketone, 3,4'-diaminodiphenyl ketone, 1,3-bis(4-aminophenoxy)benzene, 1,3-bis(3-aminophenoxy)benzene, 1,4-bis(y-aminopropyl)tetramethyldisiloxane, and 4,4'-diaminodiphenyl sulfide. These diamines can be used singly or in combination. 4) Preferred Base Catalyst The base could be but is not restricted to bases such as pyridine, trialkylamine, methylpyridine, lutidine, n-methylmorpholine, and the like. The most preferred class of base catalysts is tertiary amines. The most preferred base catalyst is triethylamine. 5) Preferred Reaction Conditions for Polvimide Formation The preferred polymerization/imidization procedure is adding a diamine or a mixture of diamines first to a tetracarboxylic diacid diester or a mixture of tetracarboxylic diacid diesters solution followed by addition of a base such as a tertiary amine to this mixture. The phosphoramide should then be added slowly to the mixture. The preferred reaction temperature is in the range of 35° C. to 60° C. The preferred reaction time is 18 hours to 24 hours. Preferably, the stoichiometric amount of diamine is about 0.9–1.1 (most preferably 0.95–1.05) moles per one mole of tetracarboxylic diacid diester. The stoichiometric amount of phosphoramide, as well as the base, is preferably about 2.8–3.8 as much as tetracarboxylic diacid diesters. The most preferred stoichiometric amount of these two reagents is 3.0–3.5 times of tetracarboxylic diacid diesters or diamines.

The reaction is generally carried out in the presence of a solvent to prevent the formation of a gel. Early gelation could inhibit the imidization reaction. The preferred solvent is N-methyl-2-pyrrolidinone (NMP). Alternatively, other solvents such as DMAC, DMSO, DMF, sulfolane and diglyme may be used.

After the reaction is over, the reaction mixture is preferably mixed with methanol to precipitate the polyimide product from any remaining phosphoramide and base catalyst. The polyimide precipitate is then washed with more methanol and then dried in a vacuum oven at 20°–50° C. to remove water and any residual alcohol or solvent.

The formation of polymer is confirmed by measuring the inherent viscosity of the product (i.e., more than about 0.15 dL/g and the imidization is confirmed by the appearance of a strong absorption at 1778 $cm^1$ in the FTIR spectrum and the absence of ester peaks of tetracarboxylic diacid diesters in NMR.

The preferred polyimide compositions are those prepared according to the procedures of Examples 1–10 below.

To illustrate the present invention, the following examples are provided. These examples, which represent specific embodiments of the present invention, should not be considered limitations of the invention.

Example 1

A preheated 250 milliliter, three necked round bottom flask equipped with nitrogen inlet, mechanical stirrer, and temperature controller was purged with nitrogen for 30 minutes. The reaction flask was then charged with 4.00 grams (12.89 moles) of oxydiphthalic anhydride (ODPA), 3.20 grams (25.79 moles) of m-hydroxybenzylalcohol (m-HBA) and 30 mL of N-methyl-2-pyrrolidone (NMP). The mixture was heated to 100° C. and stirred at this temperature for three hours. The mixture was then cooled to room temperature and 2.58 grams (12.89 mmoles) of oxydianiline (ODA) was added. The mixture was stirred for a few minutes and ODA was fully dissolved. 4.00 grams (39.53 mmoles) of triethyl amine was then added and the mixture was stirred for 5 minutes. 16.30 grams (42.55 mmoles) of diphenyl (2,3-dihydro-2-thioxo-3-benzoxazoyl) phosphonate (DDTBP) was then added portion-wise within 15 minutes. To this mixture was then added another 30 mL NMP and the reaction mixture was heated to 50° C. and stirred at this temperature for 20 hours. The reaction mixture was then cooled to room temperature and was added slowly to 750 mL methanol. After stirring for 30 minutes the precipitated product was separated by filtration. This was then washed with another 750 mL methanol. After filtration the product was dried in a vacuum oven at 50° C. for 20 hours. The final product was characterized by H NMR, FTIR and inherent viscosity. The absence of the peak with the chemical shift of 5.2 in the IH NMR spectrum means no benzylic ester groups were present. The presence of a strong band at 1778 cm in the FTIR spectrum was indicative of substantial imidization. Inherent viscosity of 1.4 dL/g (0.50 grams in 100 mL of NMP) was indicative of a high degree of polymerization.

Example 2

The general procedure of the Example 1 was repeated with the exception that the polymerization/imidization step was run at 25° C. Again H NMR and FTIR indicated that the final product was a polyimide with an inherent viscosity of 0.40 dL/g.

Example 3

A preheated 250 milliliter, three necked round bottom flask equipped with nitrogen inlet, mechanical stirrer and temperature controller was purged with nitrogen for 30 minutes. The reaction flask was then charged with 4.00 grams (12.41 mmoles) of 3,3', 4,14'-benzophenonetetracarboxylic dianhydride (BTDA), 3.08 grams (25.79 mmoles) of m-hydroxybenzylalcohol (m-HBA) and 30 mL N-methyl-2-pyrrolidone (NMP). The mixture was heated to 100° C. and stirred at this temperature for three hours. The mixture was then cooled to room temperature and to that was added 2.49 grams (12.41 mmoles) of oxydianiline (ODA). The mixture was stirred for a few minutes and ODA was fully dissolved. 4.00 grams (39.53 mmoles) of triethylamine was then added and the mixture was stirred for 5 minutes. 15.7 grams (40.56 mmoles) of diphenyl (2,3-dihydro-2-thioxo-3-4benzoxazoyl)phosphonate (DDTBP) was then added portion-wise within 15 minutes. To this mixture was then added another 40 mL NMP and the reaction mixture was heated to 50° C. and then stirred at this temperature for 20 hours. There was a substantial amount of precipitate in the reaction flask at this stage. The reaction mixture was then cooled to room temperature and was added slowly to 750 mL methanol. After stirring for 30 minutes the precipitated product was separated by filtration. This was then washed with another 750 mL methanol. After filtration the product was dried in a vacuum oven at 50° C. for 20 hours. The final product was characterized by FTIR. The presence of a strong band at 1778 cm in the FTIR spectrum was indicative of substantial imidization.

Example 4

A preheated 250 milliliter, three necked round bottom flask equipped with nitrogen inlet, mechanical stirrer and temperature controller was purged for 30 minutes. The reaction flask was then charged with 4.44 grams (10.00 mmoles) of hexafluoroisopropylbis(phthalic dianhydride) (6FDA), 2.50 grams (20.00 mmoles) of m-hydroxybenzylalcohol (m-HBA) and 30 mL N-methyl-2-pyrrolidone (NMP). The mixture was heated to 100° C. and stirred at this temperature for three hours. The mixture was then cooled to room temperature and to that was added 2.00 grams (10.00 mmoles) of oxydianiline (ODA). The mixture was stirred for a few minutes and ODA was fully dissolved. 4.00 grams (39.53 mmoles) of triethylamine was then added and the mixture was stirred for 5 minutes. 12.65 grams (33.00 mmoles) of diphenyl (2,3-dihydro-2-thioxo-3-benzoxazoyl)phosphonate (DDTBP) was then added portion-wise within 15 minutes. To this mixture was then added another 30 mL NMP and the reaction mixture was heated to 50° C. and stirred at this temperature for 20 hours. The work up was done in the same way as Example 3. The final product was characterized by $^1$H NMR, FTIR and inherent viscosity. The absence of the peak with the chemical shift of 5.2 in the 3H NMR spectrum meant that no benzylic ester were present. The presence of a strong band at 1778 cm$^1$ in the FTIR spectrum was indicative of substantial imidization. The inherent viscosity of this polyimide was 0.19 dL/g (0.50 grams in 100 mL of NMP).

Example 5

A preheated 250 milliliter, three necked round bottom flask equipped with nitrogen inlet, mechanical stirrer and temperature controller was purged with nitrogen for 30 minutes. The reaction flask was then charged with 4.00 grams (13.60 mmoles) of 3,3', 4,4'-biphenyl tetracarboxylic dianhydride (BPDA), 3.38 grams (27.23 mmoles) of m-hydroxybenzylalcohol (m-HBA) and 40 mL N-methyl-2-pyrrolidone (NMP). The mixture was heated to 100° C. and stirred at this temperature for three hours. The mixture was then cooled to room temperature and 2.72 grams (13.58 mmoles) of oxydianiline (ODA) was added. The mixture was stirred for a few minutes and ODA was fully dissolved. 4.00 grams (39.53 mmoles) of triethylamine was then added and the mixture was stirred for 5 minutes. 17.20 grams (44.87 mmoles) of diphenyl (2,3-dihydro-2-thioxo-3-benzoxazoyl)phosphonate (DDTBP) was then added portion-wise within 15 minutes. To this mixture was then added another 30 mL NMP and the reaction mixture was heated to 50° C. and stirred at this temperature for 20 hours. A large amount of precipitation was formed during this stage. The work up was done the same way as Example 3. The final product was characterized by FTIR and the presence of a strong band at 1778 cm in the FTIR spectrum was indicative of substantial imidization.

Example 6

A preheated 250 milliliter, three necked round bottom flask equipped with nitrogen inlet, mechanical stirrer and temperature controller was purged with nitrogen for 30 minutes. The reaction flask was then charged with 4.00 grams (12.89 mmoles) of oxydiphthalic anhydride (ODPA), 3.20 grams (25.79 mmoles) of m-hydroxybenzylalcohol (m-HBA) and 30 mL N-methyl-2-pyrrolidone (NMP). The mixture was heated to 100° C. and stirred at this temperature for three hours. The mixture was then cooled to room temperature and to that was added 3.89 grams (13.3 mmoles) 1,3-bis(4-amino-phenyoxy)benzene. The mixture was stirred for a few minutes and the solid was fully dissolved. 4.00 grams (39.53 mmoles) of triethylamine was then added and the mixture was stirred for 5 minutes. 16.30 grams (42.55 mmoles) of diphenyl (2,3-dihydro-2-thioxo-3-benzoxazoyl)phosphonate (DDTBP) was then added portion-wise within 15 minutes. To this mixture was then added another 30 mL NMP and the reaction mixture was heated to 50° C. and stirred at this temperature for 20 hours. A very viscous 3 solution was formed overnight. To this was added 50 mL of NMP and the reaction mixture was cooled to room temperature. This mixture was then added slowly to 1.5 liters of methanol. After stirring for 30 minutes the precipitated product was separated by filtration. The product was then washed with another 1.5 liters of methanol. After filtration the product was dried in a vacuum oven at 50° C. for 20 hours. The final product was characterized by FTIR and inherent viscosity. The presence of a strong band at 1778 cm in the FTIR spectrum was indicative of substantial imidization. The inherent viscosity of this polyimide was 0.38 dL/g (0.50 grams in 100 m/L of NMP).

Example 7

A preheated 250 milliliter, three necked round bottom flask equipped with nitrogen inlet, mechanical stirrer and temperature controller was purged with nitrogen for 30 minutes. The reaction flask was then charged with 4.00 grams (12.89 mmoles) of oxydiphthalic anhydride (ODPA), 3.20 grams (25.79 mmoles) of m-hydroxybenzylalcohol (m-HBA) and 30 ml N-methyl-2-pyrrolidone (NMP). The mixture was heated to 100° C. and stirred at this temperature for three hours. The mixture was then cooled to room temperature and to that was added 3.43 grams (12.89 mmoles) of 1,4-phenylindane diamine (DAPI). The mixture was stirred for a few minutes and DAPI was fully dissolved. 4.00 grams (39.53 mmoles) of triethylamine was then added and the mixture was stirred for 5 minutes. 16.30 grams (42.55 mmoles) of diphenyl (2,3-dihydro-2-thioxo-3-benzoxazoyl)phosphonate (DDTBP) was then added portion-wise within 15 minutes. To this mixture was then added another 40 ml NMP and the reaction mixture was heated to 50° C. and stirred at this temperature for 20 hours. The work up was done the same way as Example 3. The final product was characterized by $^1$H NMR, FTIR and inherent viscosity. The absence of the peak with the chemical shift of 5.2 in the $^1$H NMR spectrum meant no benzylic esters were present. The presence of a strong band at 1778 cm$^1$ in the FTIR spectrum was indicative of substantial imidization. The inherent viscosity of polyimide product was 0.19 dL/g.

Example 8

A preheated 125 milliliter, three necked round bottom flask equipped with nitrogen inlet, mechanical stirrer and temperature controller was purged with nitrogen for 30 minutes. The reaction flask was then charged with 2.00 grams (6.45 mmoles) of oxydiphthalic anhydride (ODPA), 0.59 grams (12.81 mmoles) of ethanol and 15 ml N-methyl-2-pyrrolidone (NMP). The mixture was heated to 80° C. and stirred at this temperature for three hours. The mixture was then cooled to room temperature and to that was added 1.29 grams (6.45 mmoles) of oxydianiline (ODA). The mixture was stirred for a few minutes and ODA was fully dissolved. 2.00 grams (19.77 mmoles) of triethylamine was then added and the mixture was stirred for 5 minutes. 8.15 grams (21.28 mmoles) of diphenyl(2,3-dihydro-2-thioxo-3-benzoxazoyl) phosphonate (DDTBP) was then added portion-wise within 15 minutes. To this mixture was then added another 20 mL NMP and the reaction mixture was heated to 50° C. and stirred at this temperature for 20 hours. The reaction mixture was then cooled at room temperature and was added slowly to 400 mL methanol. After stirring for 30 minutes 5 the precipitated product was separated by filtration. The product was then washed with another 500 mL methanol. After filtration the product was dried in a vacuum oven at 50° C. for 20 hours. The final product was characterized by FTIR 10 and inherent viscosity. The presence of a strong band at 1778 cm$^1$ in the FTIR spectrum was indicative of substantial imidization. The inherent viscosity of the product was 0.78 dL/g.

Example 9

A preheated 125 milliliter, three necked round bottom flask equipped with nitrogen inlet, mechanical stirrer and temperature controller was purged with nitrogen for 30 minutes. The reaction 20 flask was then charged with 2.00 grams (6.45 mmoles) of oxydiphthalic anhydride (ODPA), 0.88 grams (14.64 mmoles) of iso-propanol and 15 mL N-methyl-2-pyrrolidone (NMP). The mixture was heated to 80° C. and stirred at this temperature for three hours. The mixture was then cooled to room temperature and to 1.29 grams (6.45 mmoles) of oxydianiline (ODA) was added. The mixture was stirred for a few minutes and ODA was fully dissolved. 2.00 grams (19.77 mmoles) of triethylamine was then added and the mixture was stirred for 5 minutes. 8.15 grams (21.28 mmoles) of diphenyl (2,3-dihydro-2-thioxo-3-benzoxazoyl)phosphonate (DDTBP) was then added portion-wise within 15 minutes. To this mixture was then added another 20 mL NMP and the reaction mixture was heated to 50° C. and stirred at this temperature for 20 hours. The work up was done the same way as Example 8. After filtration the product was dried in a vacuum oven at 50° C. for 20 hours. The final product was characterized by FTIR and inherent viscosity. The presence of a strong band at 1778 cm in the FTIR spectrum was indicative of substantial imidization.

Example 10

A preheated 100 milliliter, three necked round bottom flask equipped with nitrogen inlet, mechanical stirrer and temperature controller was purged with nitrogen for 30 minutes. The reaction flask was then charged with 1.61 grams (5.00 mmoles) of 3,3',4,4'-benzophenonetetracarboxylic dianhydride (BTDA), 0.46 grams (10.00 mmoles) of ethanol and 40 ml N-methyl-2-pyrrolidone (NMP). The mixture was heated to 70° C. and stirred at this temperature for three hours. The mixture was then cooled to room temperature and to that was added 1.01 grams (5.00 mmoles) of oxydianiline (ODA). The mixture was stirred for a few minutes and ODA was fully dissolved. 1.50 grams (14.82 mmoles) of triethylamine was then added and the mixture was stirred for a few minutes. 6.33 grams (16.51 mmoles) of diphenyl(2,3-dihydro-2-thioxo-3-benzoxazoyl)phosphonate (DDTBP) was then added portion-wise within 15 minutes. To this mixture was then added another 10 mL NMP and the reaction mixture was heated to 50° C. and stirred at this temperature for 20 hours. The reaction mixture was then cooled to room temperature and was added slowly to 1 liter methanol. After stirring for 30 minutes the precipitated product was separated by filtration. The product then washed with another 1 liter of methanol. After filtration the product was dried in a vacuum oven at 50° C. for 20 hours. The final product was characterized by FTIR and inherent viscosity. The presence of a strong band at 1778 cm$^1$ in the FTIR spectrum was indicative of substantial imidization. The inherent viscosity of the product was 0.46 dL/g.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A process for producing a polyimide composition comprising reacting at least one diamine, at least one tetracarboxylic diacid diester, phosphoramide and at least one base to form a polyimide composition, said reaction carried out at a temperature from about 20° C. to about 60° C. and wherein the molar ratio of diamine: tetracarboxylic diacid diester:phosphoramide:base catalyst is in the range of 0.8–1.2:1:2.5–4.0:2.5–4.0; and wherein said phosophoramide is a compound of formula (2):

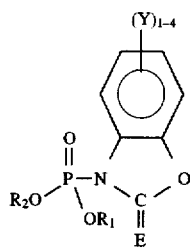
(2)

wherein E is either oxygen or sulfur; $R_1$ and $R_2$ are individually selected from the group consisting of alkyl group having 1–4 carbon atoms, aryl group; substituted aryl group having 1–3 substituents wherein said substituents are individually selected from halogen group, nitro group, alkyl group having 1–4 carbon atoms, and group having 1–4 carbon atoms; and each Y is individually selected from halogen group, nitro group, aryl group, alkyl group having 1–4 carbon atoms; and alkoxy group having 1–4 5 carbon atoms.

2. The process of claim 1 wherein said phosphoramide is diphenyl (2,3-dihydro-2-thioxo-3-benzoxazoyl) phosphonate.

3. The process of claim 1 wherein the base catalyst is a tertiary amine.

4. The process of claim 3 wherein the tertiary amine is triethylamine.

5. The process of claim 1 wherein the mole ration of diamine: 0.9:1.1:1:2.8–3.8:2.8–3.8.

* * * * *

UNITED STATES PATENT AND TRADEMARK OFFICE
CERTIFICATE OF CORRECTION

PATENT NO. : 5,789,525

DATED : August 4, 1998

INVENTOR(S) : Ahmad Naiini, Steve L.C. Hsu, William D. Weber and Andrew J. Blakeney It is certified that error appears in the above-identified patent and that said Letters Patent is hereby corrected as shown below:

Column 1, line 28, "common" should read --commonly--.
Column 1, line 62, "Hayese", should read -- Hayase--.
Column 1, Line 64, "diamine a" should read -- diamine to make a --.
Column 4, line 2, "1-11" should read --1-10--.
Column 5, line 19, "H NMR," should read --$^1$H-NMR,--.
Column 5, line 21, "IH NMR should read --$^1$H-NMR--.
Column 5, line 30, "H NMR" should read --$^1$H-NMR--.
Column 6, line 18, "1H NMR," should read --$^1$H-NMR,--.
Column 6, line 20, "3H NMR," should read --$^1$H-NMR--.
Column 6, line 21, "ester" should read -- esters--.
Column 7, line 22, "ml" should read --mL--.
Column 7, line 33, "ml" should read --mL--.
Column 7, line 36, " H NMR should read --$^1$H-NMR--.
Column 7, line 38, " H NMR" should read --$^1$H-NMR--.
Column 7, line 48, "ml" should read --mL--.
Column 8, line 13, "to 1.29" should read --1.29--.
Column 8, line 36, "ml" should read --mL--.

UNITED STATES PATENT AND TRADEMARK OFFICE
CERTIFICATE OF CORRECTION

PATENT NO. : 5,789,525
DATED : August 4, 1998
INVENTOR(S) : Ahmad Naiini, Steve L.C. Hsu, William D. Weber and Andrew J. Blakeney It is certified that error appears in the above-identified patent and that said Letters Patent is hereby corrected as shown below:

Claim 1, column 10, line 6, "and group" should read -- and alkoxy group --
Claim 1, column 10, line 9, "1-4 5" should read --1-4--.
Claim 5, column 10, line 18, "ration" should read --ratio--.
Claim 5, column 10, line 19 of the Patent, "diamine: 0.9:1.1:1:2.8-3.8:2.8-3.8." should read --diamine:tetracarboxylic diacid diester:phosphoramide:base catalyst is about 0.9-1.1:1:2.8-3.8:2.8-3.8--.

Signed and Sealed this

Fourth Day of April, 2000

Attest:

Attesting Officer

Q. TODD DICKINSON

Director of Patents and Trademarks